United States Patent
Sugaya

(10) Patent No.: US 10,685,231 B2
(45) Date of Patent: Jun. 16, 2020

(54) COMPUTER SYSTEM, AND METHOD AND PROGRAM FOR DIAGNOSING PLANTS

(71) Applicant: OPTIM CORPORATION, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 0 days.

(21) Appl. No.: 16/492,443

(22) PCT Filed: Oct. 31, 2016

(86) PCT No.: PCT/JP2016/082301
§ 371 (c)(1),
(2) Date: Sep. 9, 2019

(87) PCT Pub. No.: WO2018/078866
PCT Pub. Date: May 3, 2018

(65) Prior Publication Data
US 2020/0042790 A1 Feb. 6, 2020

(51) Int. Cl.
*G06K 9/00* (2006.01)
*A01G 7/06* (2006.01)
(52) U.S. Cl.
CPC ........... *G06K 9/00657* (2013.01); *A01G 7/06* (2013.01); *G06K 2009/00644* (2013.01)
(58) Field of Classification Search
CPC ........... G06T 2207/10048; G06T 2207/30188; G01N 33/0098; G06K 2209/17; G06K 9/00657
See application file for complete search history.

(56) References Cited

U.S. PATENT DOCUMENTS 5,133,605 A * 7/1992 Nakamura ........... G08B 13/194
250/330
2015/0254860 A1* 9/2015 Wang .................. G06K 9/6227
382/190

(Continued)

FOREIGN PATENT DOCUMENTS

CN 106067169 * 11/2016 ............. G01N 21/17
JP 2003-339648 A 12/2003

(Continued)

OTHER PUBLICATIONS

SeA, Raza, et al. "Automatic Detection of Diseased Tomato Plants Using Thermal and Stereo Visible Light Images." PLoS NE 10.4 (2015): e0123262. (Year: 2015).*

(Continued)

*Primary Examiner* — Li Liu
(74) *Attorney, Agent, or Firm* — Norton Rose Fulbright US LLP; James R. Crawford

(57) ABSTRACT

The purpose of the present disclosure is to provide a computer system, a plant diagnosis method, and a program in which the accuracy of plant diagnosis can be improved. The computer system acquires a visible light image of a plant imaged by a camera, compares the acquired visible light image with a normal visible light image of the plant and performs image analysis, identifies a species of the plant according to the result of the image analysis, identifies an abnormal portion of the plant according to the result of the image analysis, acquires environmental data of the plant, and diagnoses a condition of the plant according to the identified species, the identified abnormal portion and the acquired environmental data.

4 Claims, 10 Drawing Sheets

(56) References Cited

U.S. PATENT DOCUMENTS

| | | | | |
|---|---|---|---|---|
| 2015/0302241 | A1* | 10/2015 | Eineren | A01J 5/007 |
| | | | | 382/110 |
| 2016/0216245 | A1* | 7/2016 | Sutton | G01N 33/0098 |
| 2017/0286772 | A1* | 10/2017 | Workman | A01G 22/00 |
| 2018/0082412 | A1* | 3/2018 | Greenberg | G06K 9/00657 |
| 2018/0180768 | A1* | 6/2018 | Wolf | G01W 1/02 |
| 2018/0350053 | A1* | 12/2018 | Sugaya | G06T 7/001 |
| 2019/0079011 | A1* | 3/2019 | Frangioni | G01N 21/6428 |
| 2019/0159681 | A1* | 5/2019 | Sugaya | G06T 7/70 |

FOREIGN PATENT DOCUMENTS

| | | |
|---|---|---|
| JP | 2006-084425 A | 2/2006 |
| JP | 2016-168046 A | 9/2016 |
| WO | 2006-064635 A1 | 6/2006 |
| WO | 2015-060376 A1 | 4/2015 |

OTHER PUBLICATIONS

Sanchez, Victor, et al. "Registration of thermal and visible light images of diseased plants using silhouette extraction in the wavelet domain." Pattern Recognition 48.7 (2015): 2119-2128.*

Barbedo, Jayme Garcia Arnal. "A review on the main challenges in automatic plant disease identification based on visible range images." Biosystems engineering 144 (2016): 52-60.*

International Search Report issued in PCT/JP2016/082301 dated Jan. 24, 2017.

* cited by examiner

Acquire visible light image S01

Perform image analysis S02

Identify species of plant S03

Identify abnormal portion of plant S04

Acquire environmental data S05

Make diagnosis S06

Diagnosis Database

| Name | Classi-fication | Breed | Period | Weather | Ambient temperature | Humidity | Precipitation | ... | Lesion color | Lesion temperature | Diagnosis |
|---|---|---|---|---|---|---|---|---|---|---|---|
| AAA | XXX | aaa | First half of July | Rain | 23°C | 45% | 300ml | ... | — | — | — |
| | | | First half of November | Sunny | 10°C | 20% | 20ml | ... | Black | 20°C | Black spot disease |
| | | bbb | ... | ... | ... | ... | ... | ... | ... | ... | ... |
| | | ... | ... | ... | ... | ... | ... | ... | ... | ... | ... |
| | YYY | ccc | ... | ... | ... | ... | ... | ... | ... | ... | ... |
| | | ddd | ... | ... | ... | ... | ... | ... | ... | ... | ... |
| | | ... | ... | ... | ... | ... | ... | ... | ... | ... | ... |

Fig. 10

COMPUTER SYSTEM, AND METHOD AND PROGRAM FOR DIAGNOSING PLANTS

This application is a 371 of International Patent Application No. PCT/JP2016/082301 filed on Oct. 31, 2016, which is incorporated herein by reference in its entirety.

TECHNICAL FIELD

The present disclosure relates to a computer system, a plant diagnosis method and program that diagnose a plant based on an image.

BACKGROUND ART

In recent years, in the field of agriculture and the like, it is performed to diagnose whether an abnormality occurs in a crop based on an image acquired by imaging the crop. The diagnosis of the crop is performed by imaging an image such as a moving image or a still image of the crop and analyzing the imaged image.

As a system configured to diagnose the crop, a configuration is disclosed for diagnosing whether an abnormality occurs by extracting data relating to the abnormality from the image (see Patent Document 1).

CITATION LIST

Patent Document

Patent Document 1: JP-A-2016-168046

SUMMARY

Technical Problem

However, in the configuration of Patent Document 1, for example, even if the plant is abnormal and the leaves are versicolor, it may difficult to diagnose the difference from the condition of a normal plant superficially, and it may be difficult to make an accurate diagnosis. Further, when there are considered to be multiple causes for an abnormality determined from the extracted data, it is difficult to make an accurate diagnosis.

The purpose of the present disclosure is to provide a computer system, a plant diagnosis method, and a program in which the accuracy of plant diagnosis can be improved.

Solution to Problem

The present disclosure provides the following solutions.

The present disclosure provides a computer system including a first image acquisition unit configured to acquire a visible light image of a plant imaged by a camera, an image analysis unit configured to compare the acquired visible light image with a normal visible light image of the plant and perform image analysis, a plant identifying unit configured to identify a species of the plant according to the result of the image analysis, an abnormal portion identifying unit configured to identify an abnormal portion of the plant according to the result of the image analysis, an environmental data acquisition unit configured to acquire environmental data of the plant, and a first diagnosis unit configured to diagnose a condition of the plant based on the identified species, the identified abnormal portion and the acquired environmental data.

According to the present disclosure, the computer system acquires a visible light image of a plant imaged by a camera, compares the acquired visible light image with a normal visible light image of the plant and performs image analysis, identifies the species of the plant according to the result of the image analysis, identifies an abnormal portion of the plant according to the result of the image analysis, acquires environmental data of the plant, and diagnoses a condition of the plant according to the identified species, the identified abnormal portion and the acquired environmental data.

The present disclosure is a category of computer system, and exerts the same function/effect according to the category even in other categories such as a plant diagnosis method and program.

Advantageous Effects of Invention

According to the present disclosure, it is capable of providing a computer system, a plant diagnosis method, and a program in which the accuracy of plant diagnosis can be improved.

BRIEF DESCRIPTION OF DRAWINGS

FIG. 10 is a diagram illustrating an example of a diagnosis database stored in the computer 10.

DESCRIPTION OF EMBODIMENTS

Hereinafter, the best aspect for carrying out the present disclosure will be described with reference to the drawings. Note that, this is merely an example, and the technical scope of the present disclosure is not limited to this.

Outline of Plant Diagnosis System 1

Figure 1:
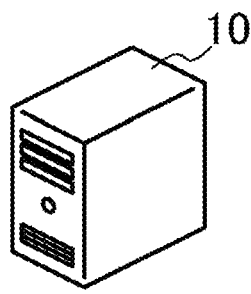
FIG. 1 is a diagram illustrating an outline of a plant diagnosis system 1.

Based on FIG. 1, an outline of a suitable embodiment of the present disclosure will be described. FIG. 1 is a diagram for explaining the outline of a plant diagnosis system 1 according to a suitable embodiment of the present disclosure. The plant diagnosis system 1 includes a computer 10, acquires an image obtained by imaging a plant, and diagnoses the condition of the plant.

The computer 10 is a computing device communicably connected to a camera such as a visible light camera or an infrared camera, a sensor, and the like (not illustrated). The plant diagnosis system 1 acquires a visible light image from a visible light camera, acquires an infrared image from an infrared camera, and acquires at least one environmental data among a group including a growth period of the plant, ambient temperature, humidity, weather, and precipitation of the environment where the plant is located from a sensor.

First, the computer 10 acquires a visible light image imaged by a camera that is not illustrated (step S01). The computer 10 acquires the visible light image such as a moving image or a still image of the plant imaged by the visible light camera.

Note that, in addition to the visible light image, the computer 10 may acquire the infrared image such as a moving image, a still image of the plant imaged by the infrared camera. At this time, the visible light camera and the infrared camera may be realized by the same imaging device, or the visible light camera and the infrared camera may image the same target by arranging the visible light camera and the infrared camera in parallel or in the vicinity. That is, the visible light camera and the infrared camera take images of the same object from substantially the same imaging point.

The computer 10 analyzes the acquired visible light image in comparison with a normal visible light image of the plant (step S02). The computer 10 compares the feature value and the color of the visible light image with the feature value and the color of the normal visible light image of the plant. The computer 10 compares a plurality of the feature values and the colors of the normal visible light images of the plant with the feature values and the colors of the acquired visible light image. Various kinds of information for identifying a plant, such as the species or the name of the plant, are associated with the feature values and the colors of the normal visible light image of the plant.

Note that, the computer 10 may compare temperatures in addition to the feature values and the colors of the acquired visible light image. In this case, the computer 10 may acquire the infrared image in addition to the visible light image, extract the temperature of the infrared image, and compare the extracted temperature with the temperature of a normal infrared image of the plant.

The computer 10 identifies the species of the plant as the result of the image analysis (step S03). By performing the image analysis described above, the computer 10 identifies the feature value and the color of the normal visible light image of the plant coincident with the feature value or the color of the visible light image acquired this time, and identifies the species of the plant associated with the identified visible light image as the species of the plant present in the visible light image acquired this time. At this time, the computer 10 identifies the feature value or the color of the normal visible light image of the plant, which is similar to or coincident with the feature value or the color of the acquired visible light image.

The computer 10 identifies an abnormal portion of the plant as the result of the image analysis (step S04). The computer 10 identifies a portion having a feature value or a color different from the normal condition of the plant among the feature values or the colors of the acquired visible light image by the image analysis described above as an abnormal portion.

Note that, the computer 10 may identify the abnormal portion of the plant based on the temperature of the acquired infrared image described above. In this case, the computer 10 may compare the extracted temperature with the temperature of the normal infrared image of the plant, and identify a portion in which the temperature is abnormal based on whether the temperature difference is within a predetermined range, or whether the temperature is coincident with a reference temperature, and the like.

The computer 10 acquires environmental data (step S05). The computer 10 acquires, from the sensor, at least one environmental data related to the living environment of the plant among a group including the growth period of the plant, ambient temperature, humidity, weather, and precipitation of the environment where the plant is located.

The computer 10 diagnoses the condition of the plant from the identified species of the plant, the identified abnormal portion, and the acquired environmental data (step S06). The computer 10 diagnoses the condition of the plant by referring to a diagnosis database in which the species of the plant, the abnormal portion, the environmental data, and the diagnosis result are associated in advance. The computer 10 executes the diagnosis of the plant by extracting the diagnosis result, which is associated with the species of the plant identified this time, the identified abnormal portion, and the acquired environmental data, from the diagnosis database.

The above is the outline of the plant diagnosis system 1.

System Configuration of Plant Diagnosis System 1

Figure 2:
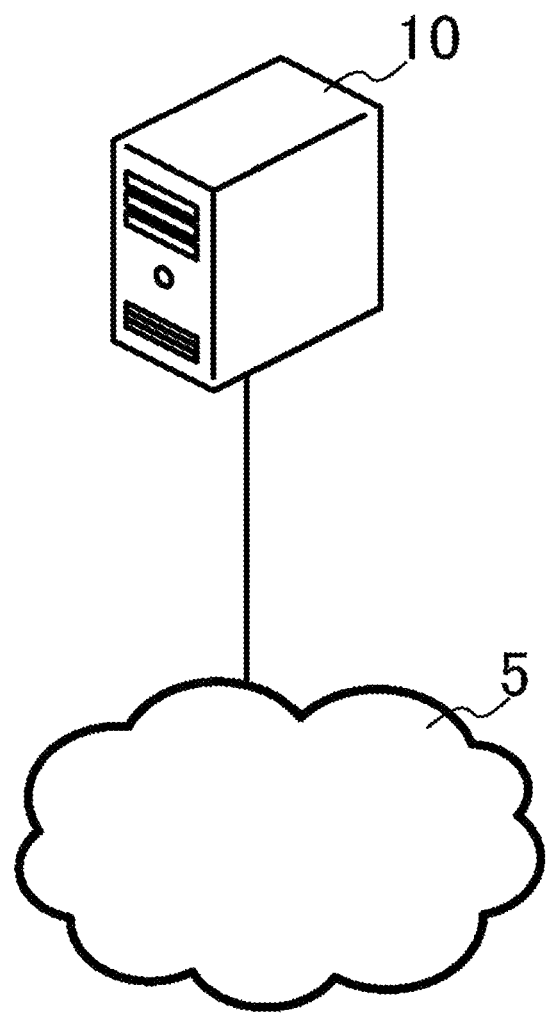
FIG. 2 is an overall configuration diagram of the plant diagnosis system 1.

Based on FIG. 2, a system configuration of the plant diagnosis system 1 according to a suitable embodiment of the present disclosure will be described. FIG. 2 is a diagram illustrating the system configuration of the plant diagnosis system 1 according to the suitable embodiment of the present disclosure. The plant diagnosis system 1 includes a computer 10 and a public network (the Internet, the third and fourth generation communication networks, etc.) 5, acquires an image obtained by imaging a plant, and diagnoses the plant.

The plant diagnostic system 1 is connected to cameras such as a visible light camera configured to image an visible light image such as a moving image and a still image of the plant or an infrared camera configured to image an infrared image such as a moving image and a still image of the plant, and sensors configured to detect at least one environmental data, which is related to the living environment of the plant, among the group including growth period of the plant, temperature, humidity, weather, and precipitation of the environment where the plant is located, such that data communication is possible. The computer 10 acquires various kinds of data from these devices.

The computer 10 is the above-described computing device having functions to be described later.

Description of Each Function

Figure 3:
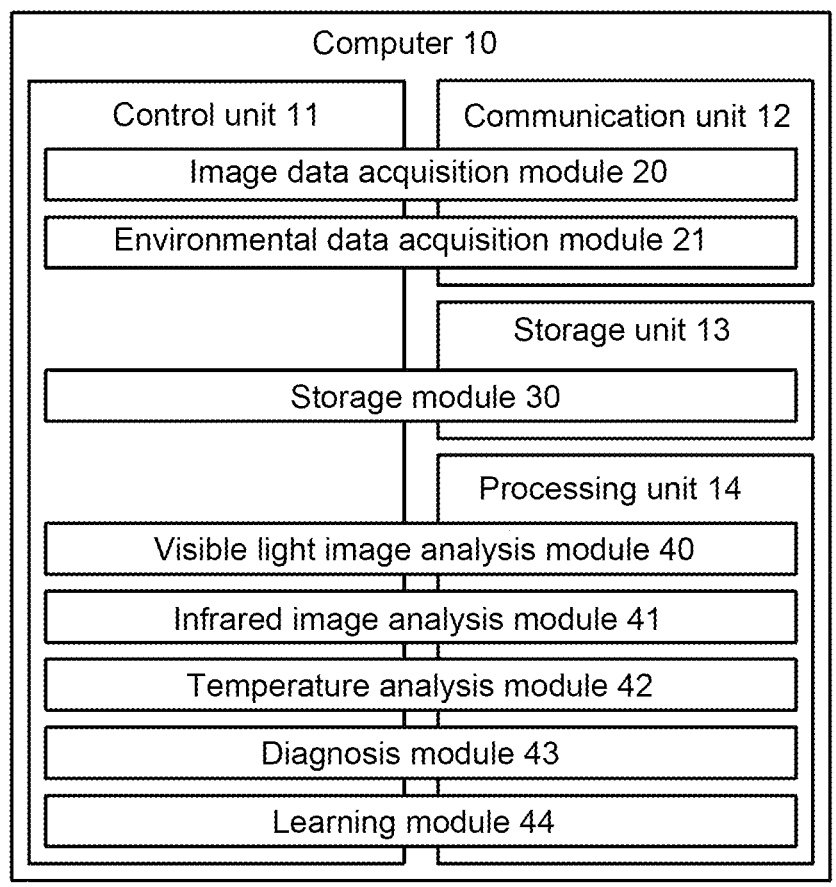
FIG. 3 is a functional block diagram of a computer 10.

Based on FIG. 3, the functions of the plant diagnosis system 1 according to a suitable embodiment of the present disclosure will be described. FIG. 3 is a functional block diagram of the computer 10.

The computer 10 includes a central processing unit (CPU), a random access memory (RAM), a read only memory (ROM), and the like as a control unit 11, and a device enabling communication with other devices (cameras, sensors) as a communication unit 12, for example, a WiFi (Wireless Fidelity) compliant device construed under IEEE802.11. Further, the computer 10 includes a data storage unit such as a hard disk, a semiconductor memory, a recording medium, a memory card, and the like, as a storage unit 13. The storage unit 13 stores various databases described later. Further, the computer 10 includes a device and the like configured to execute various processes such as image processing and condition diagnosis as a processing unit 14.

In the computer 10, the control unit 11 reads a predetermined program in cooperation with the communication unit 12 to realize an image data acquisition module 20, and an environmental data acquisition module 21. Further, in the computer 10, the control unit 11 reads a predetermined program in cooperation with the storage unit 13 to realize a storage module 30. Further, in the computer 10, the control unit 11 reads a predetermined program in cooperation with the processing unit 14 to realize a visible light image analysis module 40, an infrared image analysis module 41, a temperature analysis module 42, a diagnosis module 43, and a learning module 44.

Plant Diagnosis Process

Figure 4:
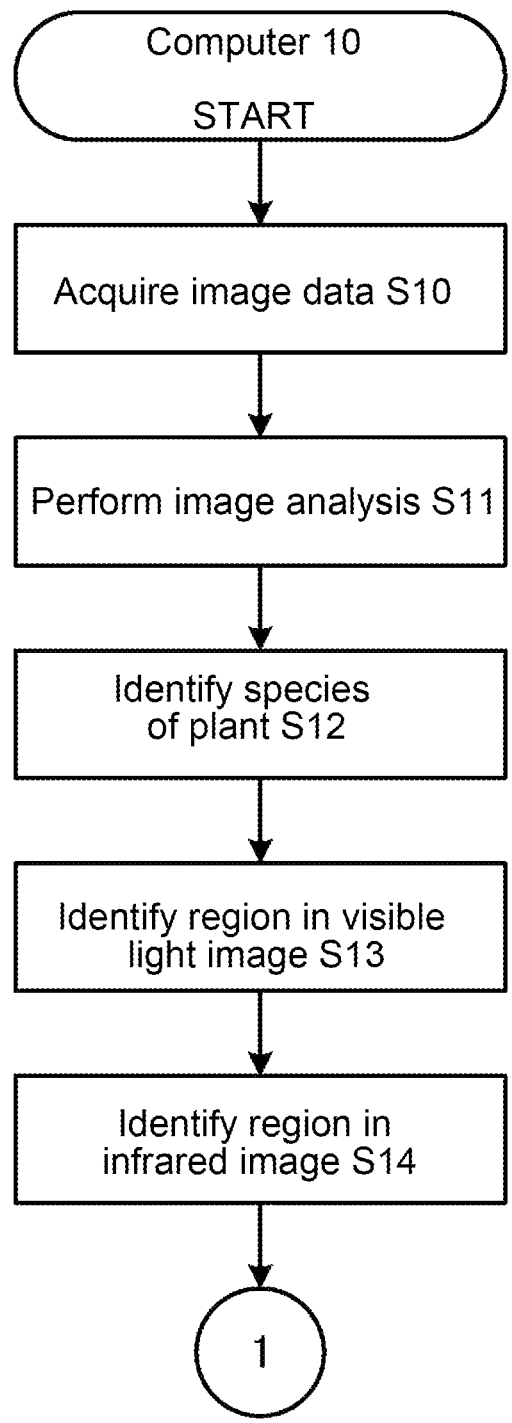
FIG. 4 is a flowchart illustrating a plant diagnosis process executed by the computer 10.
Figure 5:
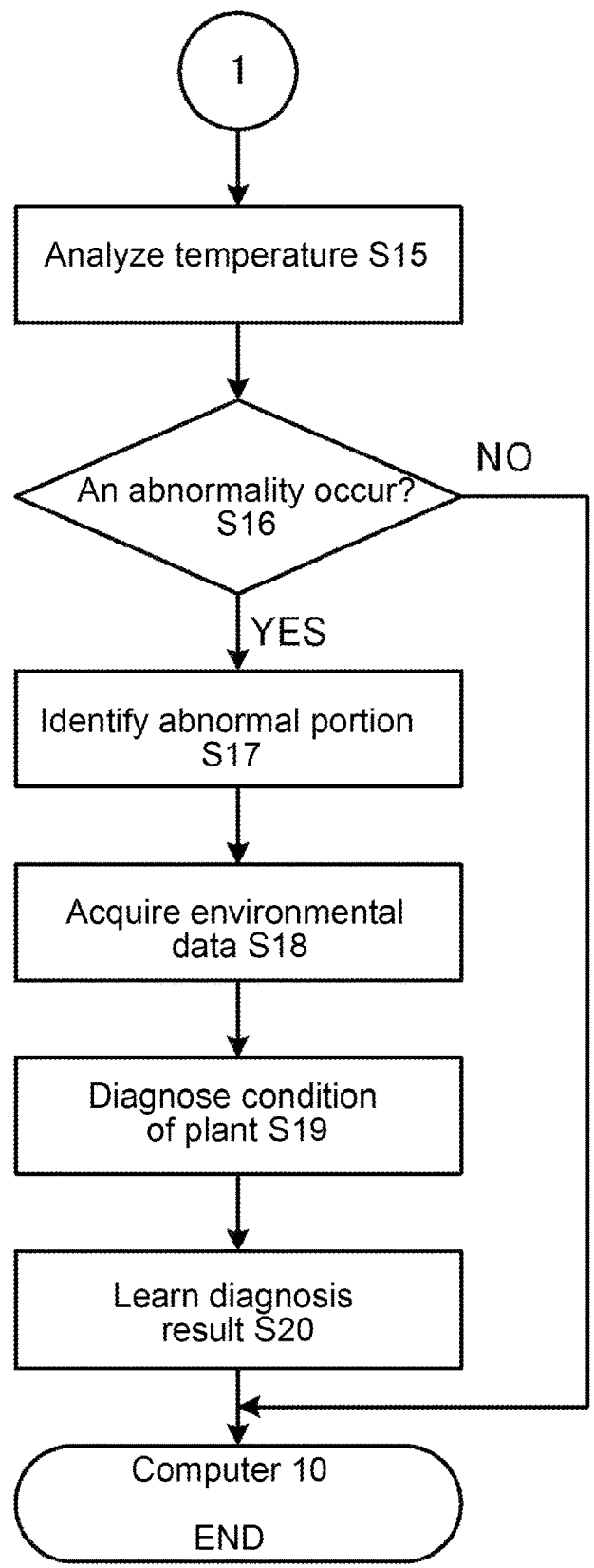
FIG. 5 is a flowchart illustrating the plant diagnosis process executed by the computer 10.

Based on FIG. 4 and FIG. 5, a plant diagnosis process executed by the plant diagnosis system 1 will be described. FIG. 4 and FIG. 5 are flowcharts illustrating the plant diagnosis process executed by the computer 10. The process executed by each module described above will be described together with this processing.

First, the image data acquisition module 20 acquires image data of the visible light image and the infrared image of the plant (step S10). In step S10, the image data acquisition module 20 acquires visible light image data that is the visible light image imaged by the visible light camera. Further, the image data acquisition module 20 acquires infrared image data that is the infrared image imaged by the infrared camera. The image data acquisition module 20 acquires the image data at a plurality of time points such as at predetermined time intervals or at preset times. The image data acquired by the image data acquisition module 20 are imaged from the same imaging point and are image data obtained by imaging the same target. Note that, in the following description, it is assumed that the computer 10 diagnoses the plant based on the image data at a predetermined time point.

Note that, the image data acquisition module 20 may acquire only visible light image data. In this case, the plant diagnosis process may be executed without the process using the infrared image data described later.

Figure 6:
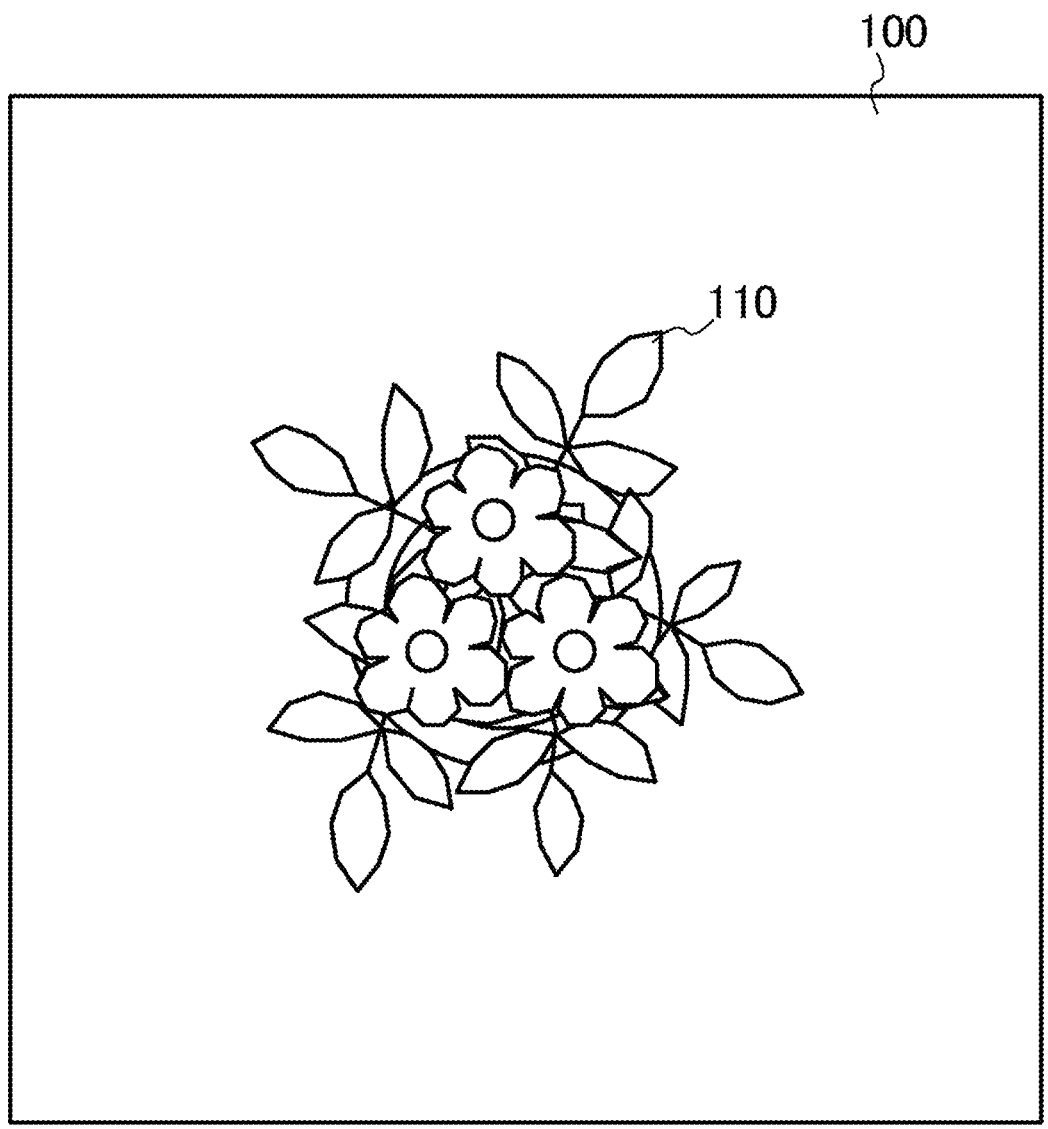
FIG. 6 is a diagram schematically illustrating an example of visible light image data acquired by the computer 10.

Based on FIG. 6, the visible light image data of the plant acquired by the image data acquisition module 20 will be described. FIG. 6 is a diagram schematically illustrating an example of the visible light image data of the plant acquired by the image data acquisition module 20. In FIG. 6, the image data acquisition module 20 acquires a visible light image 100 indicating the visible light image data. In the visible light image 100, a plant 110 is reflected. Note that, landscape, natural object, artificial object other than the plant 110 may be reflected in the visible light image 100, but are omitted for simplification of the description. Further, a plurality of the plants 110 or plant of different species from the plant 110 may be reflected in the visible light image 100.

Figure 7:
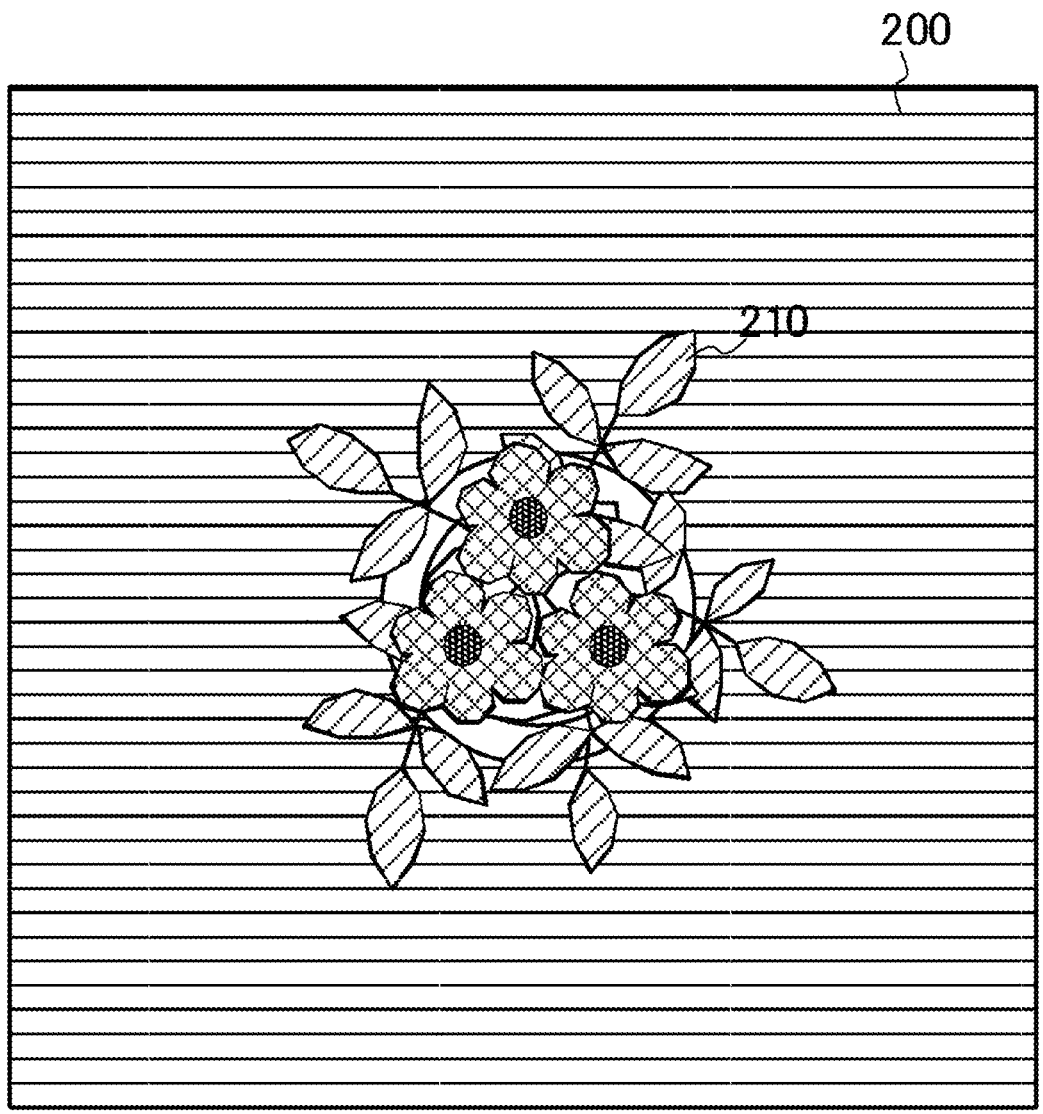
FIG. 7 is a diagram schematically illustrating an example of infrared image data acquired by the computer 10.

Based on FIG. 7, the infrared image data of the plant acquired by the image data acquisition module 20 will be described. FIG. 7 is a diagram schematically illustrating an example of the infrared image data of the plant acquired by the image data acquisition module 20. In FIG. 7, the image data acquisition module 20 acquires an infrared image 200 indicating the infrared image data. In the infrared image 200, a plant 210 is reflected. In the infrared image 200, each temperature is indicated by hatching for convenience. Note that, landscape, natural object, artificial object other than the plant 210, may be reflected in the infrared image 200, but are omitted for simplification of the description. Further, a plurality of the plants 210 or plant of different species from the plant 210 may be reflected in the infrared image 200.

The visible light image analysis module 40 analyzes the acquired visible light image data (step S11). In step S11, the visible light image analysis module 40 compares the acquired visible light image with a visible light image of a normal condition of the plant stored in advance in the storage module 30. The visible light image of the normal condition of the plant is an image that is imaged a part or the entire plant site such as a flower, a branch, a leaf, a stem, and a fruit, in a healthy condition by a visible light camera for each species or each individual of the plant. The storage module 30 associates and stores various kinds of information for identifying plants such as species and individuals in the visible light image of the normal condition of the plants. The visible light image analysis module 40 extracts the feature value such as the shape and size of each site and the color of each site of the acquired visible light image. Further, the visible light image analysis module 40 extracts the feature value and the color of each site of the visible light image stored in the storage module 30. The visible light image analysis module 40 compares the feature value and the color extracted from the acquired visible light image with the feature value and the color extracted from the stored visible light image.

The visible light image analysis module 40 recognizes the shape of the plant present in the visible light image by executing edge analysis or the like on the acquired visible light image. Further, the visible light image analysis module 40 recognizes the shape of the plant present in the visible light image by executing edge analysis or the like on the visible light image stored in the storage module 30. The visible light image analysis module 40 compares these shapes. Further, the visible light image analysis module 40 recognizes the RGB values of the visible light image by executing color extraction or the like on the acquired visible light image. Further, the visible light image analysis module 40 recognizes the RGB values of the visible light image by executing color extraction or the like on the visible light image stored in the storage module 30. The visible light image analysis module 40 compares these RGB values.

The visible light image analysis module 40 identifies the species of the plant based on the result of the image analysis (step S12). In step S12, a stored visible light image having coincident or similar feature value or color is identified based on the feature value or the color extracted from the acquired visible light image. The visible light image analysis module 40 acquires various kinds of information for identifying the plant associated with the visible light image.

Note that, when a plurality of plant individuals are recognized in the visible light image, the visible light image analysis module 40 executes process of step S11 and step S12 described above with respect to each individual to identify the species of each individual.

Further, the computer 10 may identify the species of the plant based on the acquired infrared image. In this case, by comparing the temperature of each site in the acquired infrared image with the temperature of each site in the infrared image of the normal condition of the plant stored in the storage module 30, the computer 10 identifies the stored infrared image having coincident or similar temperature with respect to the temperature recognized from the acquired infrared image, and identifies the species of the plant associated to the identified infrared image. The computer 10 may execute this process for each individual when a plurality of plant individuals present in the infrared image. Further, the computer 10 may identify the species of the plant based on both the acquired visible light image and the infrared image. In this case, the process for the visible light image and the process for the infrared image that are executed by the computer 10 described above may be executed in combination.

The visible light image analysis module 40 identifies, in the visible light image, a plurality of regions corresponding to a plurality of predetermined sites of the plant respectively. In step S13, the predetermined site is, for example, a part of the structure such as a flower, a branch, a leaf, a stem, a fruit, or a preset site. The visible light image analysis module 40 recognizes, in the visible light image, the position of a part of the structure or a preset site according to the feature value, and identifies the recognized position as a region corresponding to the predetermined site. Further, the visible light image analysis module 40 recognizes, in the visible light image, the position of a part of the structure or a preset site according to the color, and identifies the recognized position as a region corresponding to the predetermined site. The visible light image analysis module 40 identifies a plurality of regions corresponding to the plurality of predetermined sites respectively.

Figure 8:
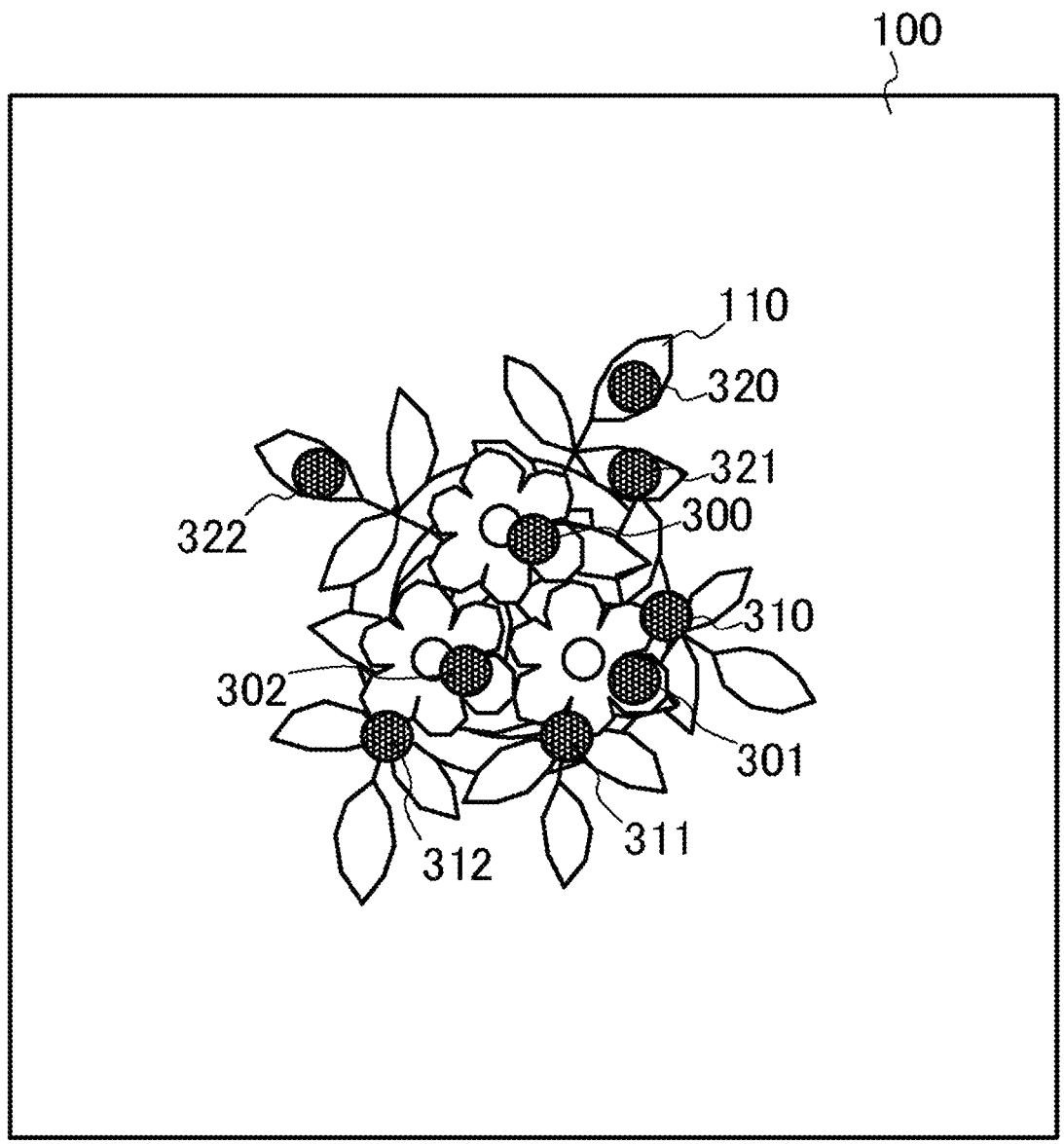
FIG. 8 is a diagram schematically illustrating an example of a state in which the computer 10 identifies a predetermined site in a visible light image.

Based on FIG. 8, the region corresponding to the predetermined site that the visible light image analysis module 40 identifies is described. FIG. 8 is a diagram schematically illustrating an example of a state in which the visible light image analysis module 40 identifies a predetermined site. In FIG. 8, based on the feature value and the color, the visible light image analysis module 40 identifies regions in the visible light image 100 in which the predetermined sites of flowers, branches, or leaves are located. That is, the visible light image analysis module 40 identifies the regions corresponding to sites of flowers 300 to 302, branches 310 to 312, and leaves 320 to 322 of the plant 110. In FIG. 8, the identified regions are indicated by hatching for convenience. Although the region refers to a part of each site, it may refer to the entire corresponding site. Note that, the number, types and positions of the sites to be identified can be changed appropriately.

Note that, when a plurality of plant individuals are recognized in the visible light image, the visible light image analysis module 40 may execute this process for each individual. Further, the visible light image analysis module 40 may recognize each individual and recognize the positional relationship of each individual. The positional relationship may be recognized based on the distance from the imaging point, the coordinates in the visible light image, and the like.

The infrared image analysis module 41 identifies a region in the infrared image corresponding to the identified region in the visible light image (step S14). In step S14, the infrared image analysis module 41 identifies the region of the infrared image corresponding to the identified region of each site of the plant by comparing the visible light image with the infrared image. The infrared image analysis module 41 acquires the position of the region in the visible light image as coordinates, and identifies a position coincident with the acquired coordinates as the region in the infrared image corresponding to the identified region in the visible light image.

Figure 9:
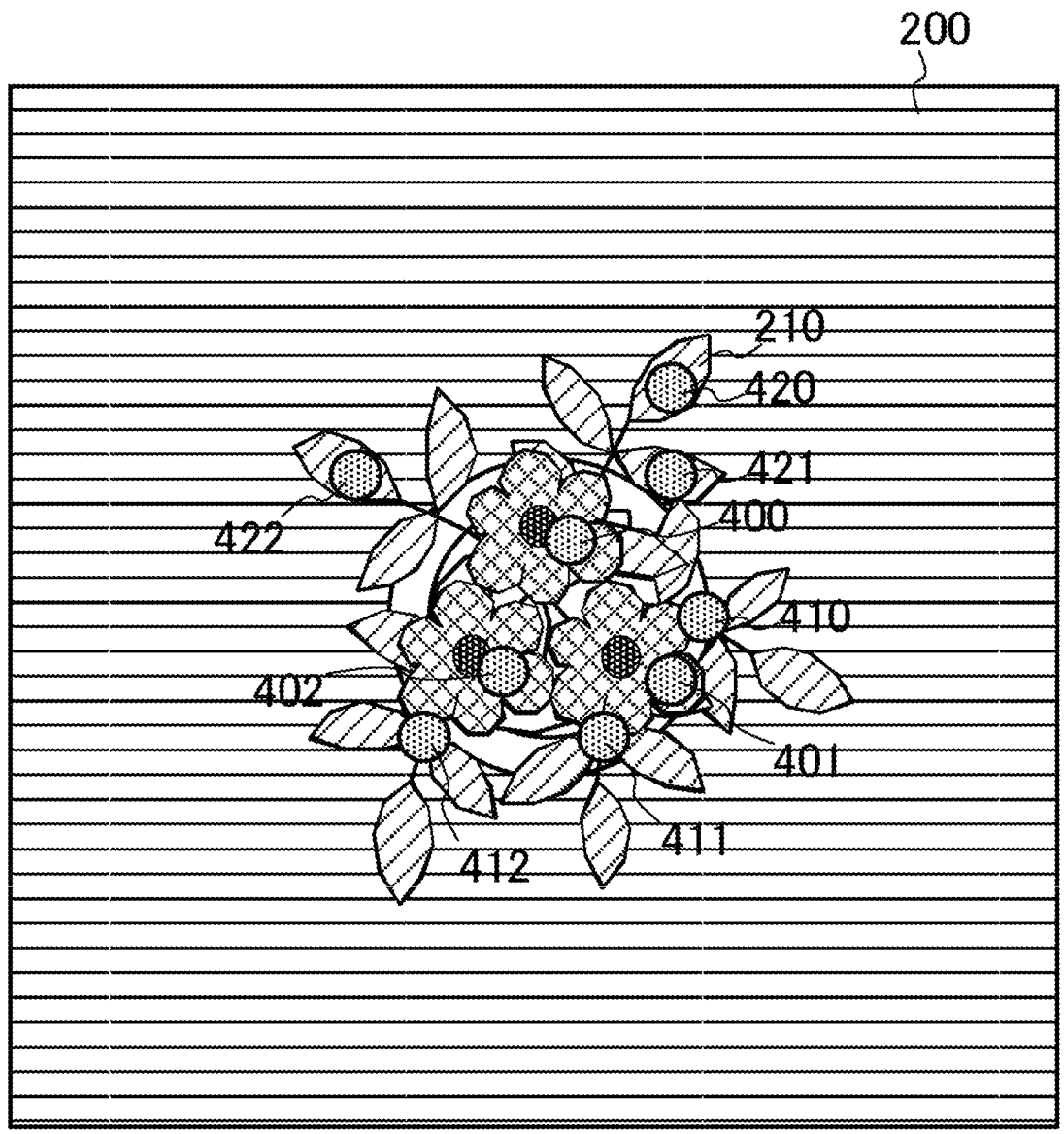
FIG. 9 is a diagram schematically illustrating an example of a state in which the computer 10 identifies a region in an infrared image.

Based on FIG. 9, the region in the infrared image corresponding to the region in the visible light image that the infrared image analysis module 41 identifies will be described. FIG. 9 is a diagram schematically illustrating an example of a state in which the infrared image analysis module 41 identifies the region in the infrared image. In FIG. 9, regions in the infrared image 200 corresponding to the sites of the flowers 300 to 302, the branches 310 to 312, and the leaves 320 to 322 of the identified plant 110 in the visible light image 100 described above is identified. It is identified by comparing the position in the visible light image 100 with the position in the infrared image 200. The infrared image analysis module 41 acquires the position coordinates of each site in the visible light image 100, and identifies the position in the infrared image corresponding to the acquired position coordinates as the region in the infrared image corresponding to the region in the visible light image. The infrared image analysis module 41 identifies sites of flowers 400 to 402, branches 410 to 412, and leaves 420 to 422 of the plant 210. In FIG. 9, the identified regions are indicated by hatching for convenience. The region refers to a part or the entire site depending on the identified site in the visible light image described above. Note that, the number, types and positions of the sites can be appropriately changed according to the visible light image.

The temperature analysis module 42 analyzes the temperature of the identified region in the infrared image (step S15). In step S15, the temperature analysis module 42 acquires the temperature of each region and identifies the temperature of each region, based on the infrared image.

The diagnosis module 43 diagnoses the plant and determines whether abnormality occurs, based on the temperature of the identified region in the infrared image (step S16). In step S16, the diagnosis module 43 diagnoses the plant based on the acquired temperature of each region. The diagnosis module 43 diagnoses the plant based on a reference temperature that is a temperature in a normal condition of the plant corresponding to each site and is stored in the storage module 30. The diagnosis module 43 calculates the temperature difference between the temperature of the identified region in the infrared image and the reference temperature that the region corresponds, and determines whether the calculated temperature difference is within a predetermined range (for example, within 0.5° C., within 1° C., within 2° C., etc.). The diagnosis module 43 determines that no abnormality occurs when it is determined that the temperature difference is within the predetermined range, and determines that an abnormality occurs when it is determined that the temperature difference is not within the predetermined range.

Note that, the diagnosis module 43 may diagnose the plant by a method other than the diagnosis based on the reference temperature described above. For example, the plant may be diagnosed according to only the temperature of the region in the identified infrared image, otherwise, when a plurality of plant individuals present, the plant may be diagnosed based on the positional relationship of each individual or the temperature of each individual. Further, the plant may be diagnosed by combining a plurality of methods. For example, the diagnosis module 43 determines an abnormality occurs when the temperature of the identified region in the infrared image is identified to be an abnormal temperature (step S16). Further, the diagnosis module 43 compares, in the identified infrared image, the temperature of the region of a first individual with the temperature of the region of a second individual, calculates the temperature difference between them, and diagnoses that an abnormality occurs in any one or both of the first individual and the second individual.

Further, the diagnosis module 43 diagnoses the plant based on one visible light image data and one infrared image data, and may diagnose the plant based on either or both of a plurality of visible light images and a plurality of infrared images acquired within a predetermined period. In this case, the diagnosis module 43 may diagnose the plant based on change amount, change width or the change itself of the feature value, the color, the temperature of the individuals acquired from any one or both of the visible light image and the infrared image. Further, the diagnosis module 43 may diagnose the plant based on the average value of the temperatures of the individuals acquired from the plurality of infrared images. That is, the diagnosis module 43 may calculate the temperature difference between the average value of the temperatures and the reference temperature by comparing the average value of the temperatures of the individual or each site with the reference temperature, and may diagnose the plant based on whether the temperature difference is within a predetermined range. Further, the diagnosis module 43 may diagnose the plant by a method other than these methods.

Further, the diagnosis module 43 may diagnose the plant based only on the visible light image without using the infrared image. In this case, the diagnostic module 43 determines whether an abnormality occurs by comparing the feature value, the color, and the like of each site or a preset site present in the visible light image, which are extracted by the visible light image analysis module 40, with the feature value, the color, and the like of the identified species of the plant.

In step S16, when the diagnosis module 43 determines that no abnormality occurs in the individual (step S16 NO), the process ends. Note that, in step S16, the computer 10 may transmit a notification indicating that no abnormality occurs in the plant to an external terminal or the like (not illustrated). The external terminal may notify the user the instruction by displaying the notification on a display unit of the external terminal or playing the notification by voice.

On the other hand, when the diagnosis module 43 determines in step S16 that an abnormality occurs (step S16 YES), the diagnosis module 43 identifies an abnormal portion of the plant that is a site where the abnormality of the plant occurs (step S17). In step S17, the diagnostic module 43 identifies the abnormal portion based on any one or both of the feature value or color of each site extracted from the visible light image and the temperature of each site identified from the infrared image. The diagnostic module 43 identifies a site where the feature value and the color of each extracted site are different from the feature value and the color of the normal condition of the plant as the abnormal portion. Further, the diagnostic module 43 identifies a portion where the temperature of each identified site is different from the temperature of the normal condition of the plant as the abnormal portion.

The environmental data acquisition module 21 acquires environmental data indicating the living environment of the plant (step S18). In step S18, the environmental data acquisition module 21 acquires at least one data among the group including growth period of the plant, temperature, humidity, weather, and precipitation of the environment where the plant is located, as the environmental data. The environmental data acquisition module 21 acquires the environmental data from sensors (not illustrated) such as a clock, a meteorological instrument, a rain gauge, a rain and snow meter, a thermometer, a wind direction anemometer, a hygrometer, a barometer, an actinometer, a pyrheliometer, a visibility meter. These sensors are disposed adjacent the plant or adjacent a place where the plant is planted.

Note that, the environmental data acquisition module 21 may acquire the environmental data at other timings. For example, the environmental data acquisition module 21 may acquire the environmental data at the same time as acquiring image data of the plant, or may acquire the environmental data after identifying the species of the plant. That is, the environmental data acquisition module 21 may acquire environmental data prior to diagnosing the condition of the plant. Further, the sensors may be sensors detecting environmental information other than the example described above. Further, the disposed position of the sensors can be appropriately changed into a position where the living environment of the plant not only the example described above can be detected.

The diagnosis module 43 diagnoses the condition of the plant from the identified species, the identified abnormal portion, and the acquired environmental data (step S19). In step S19, the diagnosis module 43 determines the condition of the plant based on the diagnosis database that is stored in the storage module 30 and associates the species of the plant, the abnormal portion of the plant, the environmental data of the plant, and the diagnosis result. The diagnostic module 43 identifies the position corresponding to the combination of the species identified this time, the identified abnormal portion, and the acquired environmental data by referring to the diagnosis database. The diagnosis module 43 extracts the diagnosis result corresponding to the position. The diagnosis module 43 diagnoses the extracted diagnosis result as the condition of the plant.

Note that, the diagnosis module 43 diagnoses the condition of the plant from any one or more of the combination of the identified species, the identified abnormal portion, and the acquired environmental data. In this case, when extracting a plurality of corresponding diagnosis results, the diagnosis module 43 may calculate the probability for each diagnosis result based on the information. For example, when a plurality of diagnosis results are acquired in the identified abnormal portion, the diagnosis module 43 calculates the probability of each diagnosis result based on the matching rate of the environmental data. Further, when a plurality of diagnosis results are acquired in the acquired environmental data, the diagnostic module 43 may set weightings in advance to each data of the environmental data, and may calculate the probability for each diagnosis result by associating the weighting with the probability. Further, the diagnosis module 43 may calculate the probability by a method other than these methods.

Diagnosis Database

Based on FIG. 10, the diagnosis database stored in the storage module 30 will be described. FIG. 10 is a diagram illustrating an example of the diagnosis database stored in the storage module 30. In FIG. 10, the storage module 30 associates and stores information for identifying a plant such as name, classification, and breed, environmental data indicating a living environment of the plant such as weather, ambient temperature, humidity, and precipitation, information for indicating the content of the abnormality that occurs, such as lesion color, lesion temperature, and the information indicating the diagnosis result. The name refers to the name of a plant. The classification refers to production area and the like. The breed refers to an industrially distinct group of individuals. The period refers to the growth period of the plant. The weather, temperature, humidity, and precipitation are various kinds of data of the living environment of the plant. Lesion color is the color when the plant is in an abnormal condition. Lesion temperature is the temperature when the plant is in an abnormal condition. Diagnosis is the condition of the plant when in these conditions. In the diagnosis database, the case where the plant is in the normal condition and the case where an abnormality occurs are associated with each other for each breed. When the plant is in a normal condition, the storage module 30 associates and stores the fact that no lesion color, no lesion temperature, and no diagnosis result. When an abnormality occurs in the plant, the storage module 30 associates and stores the content that respectively corresponds to the lesion color, the lesion temperature, and the diagnosis result.

Note that, in the diagnosis database, the information for identifying the plant, the information for indicating the environmental data, the lesion color, the lesion temperature, and the diagnosis result are not limited to the examples described above, and other information may be added, otherwise, some of the items described above may be deleted. Further, the lesion temperature may not be included. Further, the number of breeds, classifications, and names is not limited to the example described above, and may be at least more than this. Further, the diagnosis database may be generated for each name, each classification, and each breed.

The diagnosis module 44 learns the diagnosis result (step S20). In step S20, the learning module 44 learns the diagnosis result using the environmental data and the visible light image or the infrared image as the feature values. That is, the environmental data and a pair of an image and a diagnosis result in the diagnostic database stored in the storage module 30 are learned as "supervised data" to generate diagnosis determination data. The storage module 30 stores the generated diagnosis determination data, and the diagnostic module 43 determines the diagnosis result based on the diagnostic determination data learned this time when acquiring a new image.

The above is the plant diagnosis process.

The units and functions described above are realized by the computer (including a CPU, an information processing device, and various terminals) reading and executing a predetermined program. The program is provided, for example, in the form provided from the computer via a network (SaaS: software as a service). Further, the program is provided, for example, in a form of being recorded on a computer-readable recording medium such as a flexible disk, a CD (such as a CD-ROM), and a DVD (such as a DVD-ROM, a DVD-RAM). In this case, the computer reads the program from the recording medium, transfers the program to an internal storage device or an external storage device, stores and executes it. Further, the program may be recorded in advance in a storage device (recording medium) such as a magnetic disk, an optical disk, and a magneto-optical disk, and may be provided from the storage device to the computer via a communication line.

The embodiments of the present disclosure have been described above, but the present disclosure is not limited to these embodiments described above. Further, the effects described in the embodiments of the present disclosure only list the most suitable effects resulting from the present disclosure, and the effects of the present disclosure are not limited to the effects described in the embodiments of the present disclosure.

REFERENCE SIGNS LIST

1 Plant diagnosis system; 10 Computer

What is claimed is:

1. A computer system, comprising: a processor and a storage; wherein the storage stores a processor-executable program executed by the processor, and the program comprises:
an image acquisition unit configured to acquire a visible light image and an infrared image of a plant imaged by a camera;
an image analysis unit configured to compare the acquired visible light image with a normal visible light image of the plant and perform image analysis;
a plant identifying unit configured to identify a species of the plant according to the result of the image analysis;
a first image processing unit configured to identify regions, in the visible light image, which are in one-to-one correspondence with a plurality of predetermined sites of the plant;
a second image processing unit configured to identify regions, in the infrared image, which are in one-to-one correspondence with the identified regions in the visible light image;
an abnormal portion identifying unit configured to identify an abnormal portion of the plant according to respective temperatures of the identified regions in the infrared image;
an environmental data acquisition unit configured to acquire environmental data of the plant; and
a diagnosis unit configured to diagnose a condition of the plant based on the identified species, a temperature of the identified abnormal portion and the acquired environmental data;
wherein the respective temperatures and the temperature are recognized from the infrared image.

2. The computer system according to claim 1, wherein the environmental data acquisition unit acquires at least one environmental data among a group including growth period of the plant, ambient temperature, humidity, weather, and precipitation of the environment where the plant is located.

3. A plant diagnosis method executed by a computer system, comprising:
acquiring a visible light image and an infrared image of a plant imaged by a camera;
comparing the acquired visible light image with a normal visible light image of the plant and performing image analysis;
identifying a species of the plant according to the result of the image analysis;
identifying regions, in the visible light image, which are in one-to-one correspondence with a plurality of predetermined sites of the plant;
identifying regions, in the infrared image, which are in one-to-one correspondence with the identified regions in the visible light image;
identifying an abnormal portion of the plant according to respective temperatures of the identified regions in the infrared image;
acquiring environmental data of the plant; and
diagnosing a condition of the plant according to the identified species, a temperature of the identified abnormal portion and the acquired environmental data;
wherein the respective temperatures and the temperature are recognized from the infrared image.

4. A non-transitory computer-readable medium causing a computer system to execute:
acquiring a visible light image and an infrared image of a plant imaged by a camera;
comparing the acquired visible light image with a normal visible light image of the plant and performing image analysis;
identifying a species of the plant according to the result of the image analysis;
identifying regions, in the visible light image, which are in one-to-one correspondence with a plurality of predetermined sites of the plant;
identifying regions, in the infrared image, which are in one-to-one correspondence with the identified regions in the visible light image;

identifying an abnormal portion of the plant according to respective temperatures of the identified regions in the infrared image;
acquiring environmental data of the plant; and
diagnosing a condition of the plant according to the identified species, a temperature of the identified abnormal portion and the acquired environmental data;
wherein the respective temperatures and the temperature are recognized from the infrared image.

* * * * *